United States Patent [19]

Watson

[11] 4,075,304
[45] Feb. 21, 1978

[54] METHOD OF MAKING FOAM FILLED PANELS

[75] Inventor: Lawrence A. Watson, Sebring, Fla.

[73] Assignee: Edgewater Marine, Inc., Sebring, Fla.

[21] Appl. No.: 653,440

[22] Filed: Jan. 29, 1976

[51] Int. Cl.$^2$ .................. B29D 27/04; B29C 5/00
[52] U.S. Cl. .................. 264/46.5; 156/79;
264/46.7; 264/255; 264/261; 264/263
[58] Field of Search .................. 264/46.2–46.8,
264/45.8, 255, 261, 33–35, 250, 263, 259, 294;
156/77–79, 295

[56] References Cited

U.S. PATENT DOCUMENTS

| | | | |
|---|---|---|---|
| 2,798,021 | 7/1957 | Land | 156/295 |
| 2,976,577 | 3/1961 | Gould | 264/46.6 |
| 3,090,078 | 5/1963 | Ackles | 264/45.5 |
| 3,123,856 | 3/1964 | Dye et al. | 264/46.2 |
| 3,435,102 | 3/1969 | Sullhofer | 264/51 |
| 3,484,509 | 12/1969 | Keller | 264/45.8 |
| 3,537,929 | 11/1970 | Keith et al. | 156/79 |
| 3,590,425 | 7/1971 | Lieberman | 264/46.3 |
| 3,639,553 | 2/1972 | Sueda et al. | 264/90 |
| 3,738,895 | 6/1973 | Paymal | 264/45.3 |
| 3,923,436 | 12/1975 | Lewis | 264/33 |

Primary Examiner—Willard E. Hoag
Attorney, Agent, or Firm—Oltman and Flynn

[57] ABSTRACT

A method of making a foam filled panel by clamping two sheets together at one end thereof, spreading the sheets at the opposite ends, introducing foamable material into a hollow, closed space between the sheets where clamped, and progressively clamping and filling space between successive adjoining portions of the sheets working toward the free ends until a foam filled panel is formed. The sheets are kept at a fixed location and a sprayer is manipulated to introduce the foamable material. Panels of unusual shapes can be formed.

5 Claims, 8 Drawing Figures

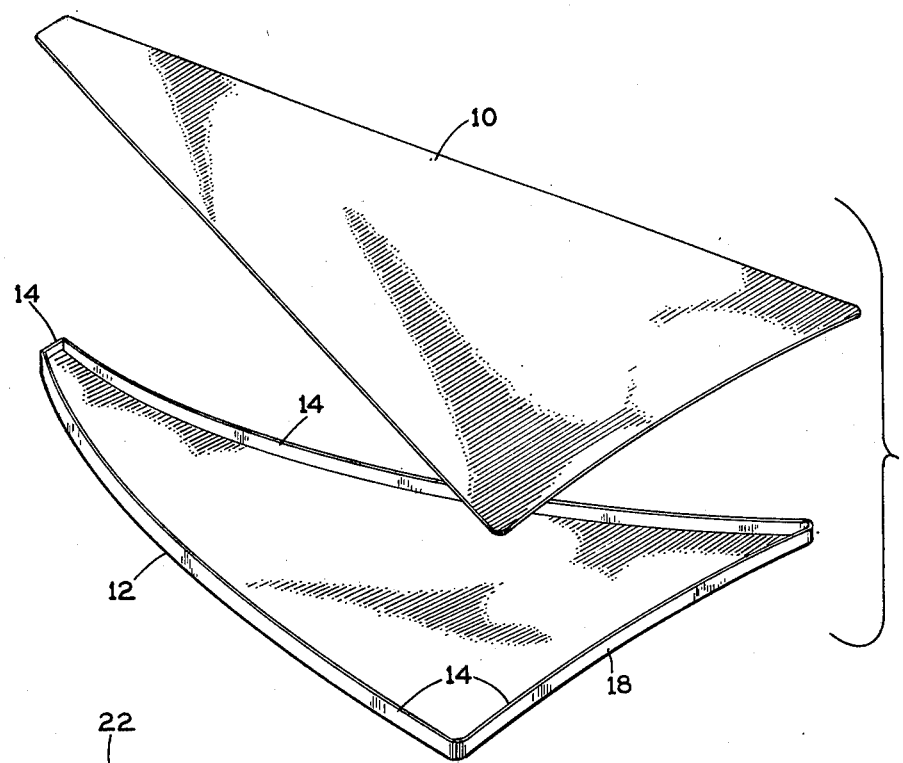
FIG. 1
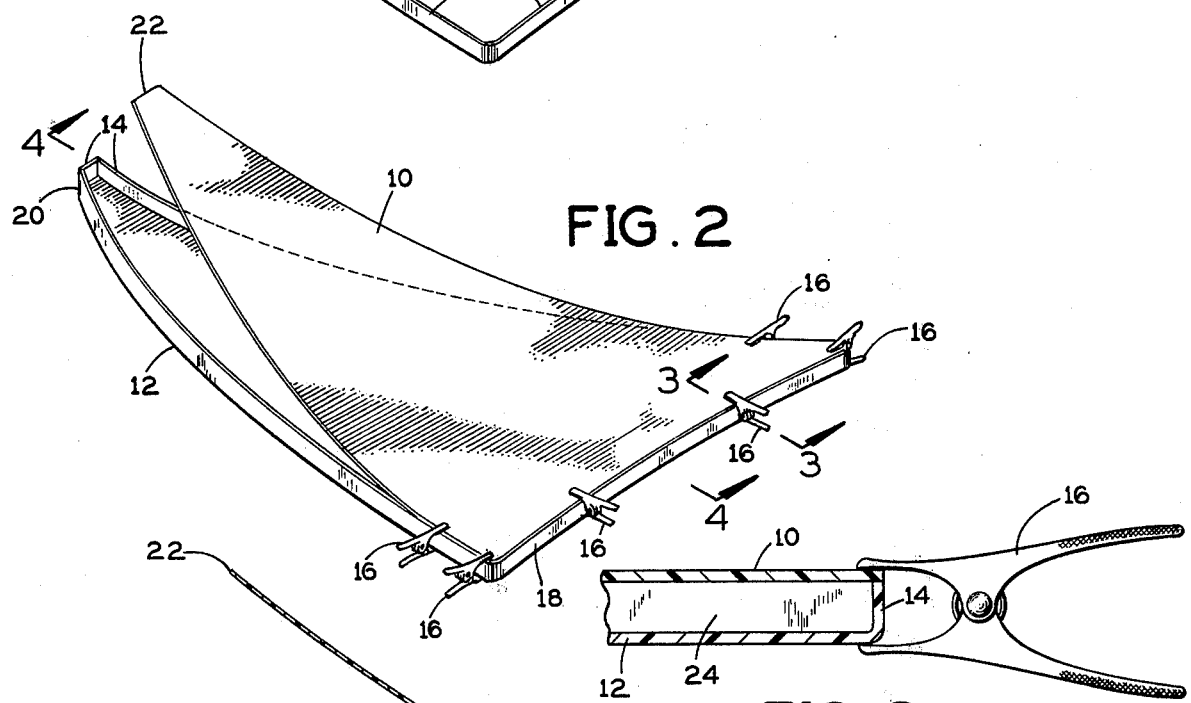
FIG. 2
FIG. 3
FIG. 4

METHOD OF MAKING FOAM FILLED PANELS

BACKGROUND OF THE INVENTION

Foam filled panels or laminates find application in many types of construction. In some applications a panel having an unusual shape is required. Known techniques for making foam filled panels generally produce flat panels. For example, continuous processes for making foam filled panels using a fixed discharge nozzle and a moving conveyor for carrying the foam material between upper and lower pressure devices are described in U.S. Pat. Nos. 3,435,102—Sullhofer, 3,590,425—Lieberman, and 3,738,895—Paymal. Such processes are not entirely suitable for making curved panels or panels having other irregular shapes.

SUMMARY OF THE INVENTION

The present method involves clamping panels together at one end and spreading them at the other end to form a hollow closed space where the panels are clamped. Foamable material is introduced into the hollow space from a sprayer or discharge nozzle. The sprayer is moved toward the free ends of the sheets, and the sheets are progressively clamped following behind the sprayer to fill the space between the sheets in successive stages working toward the free ends of the sheets until a foam filled panel is formed. The method is particularly suited for forming curved panels or panels with other unusual shapes. A major advantage of the method as compared to molding in fixed molds is that high pressures accompanying expansion of the foaming material are avoided since the foam material is free to expand toward the open ends of the sheets.

Accordingly, it is an object of the invention to provide a method of making foam filled panels of unusual shapes.

Another object of the invention is to fill fixed-length panels with foam without requiring special materials handling equipment.

A further object of the invention is to avoid excessive mold pressures in filling panels with foam such as are encountered in fixed molds.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 1 is a perspective view showing two sheets to be placed together and filled with foam in order to form a foam filled panel in accordance with the method of the invention;

FIG. 2 is a perspective view showing the sheets of FIG. 1 clamped together at one end;

FIG. 3 is a fragmentary sectional view taken along line 3—3 of FIG. 2 showing the hollow space or cavity formed where the sheets are clamped;

FIG. 4 is a sectional view taken along line 4—4 of FIG. 2 illustrating foamable material being introduced into the hollow space between the sheets where clamped;

Figure 5:
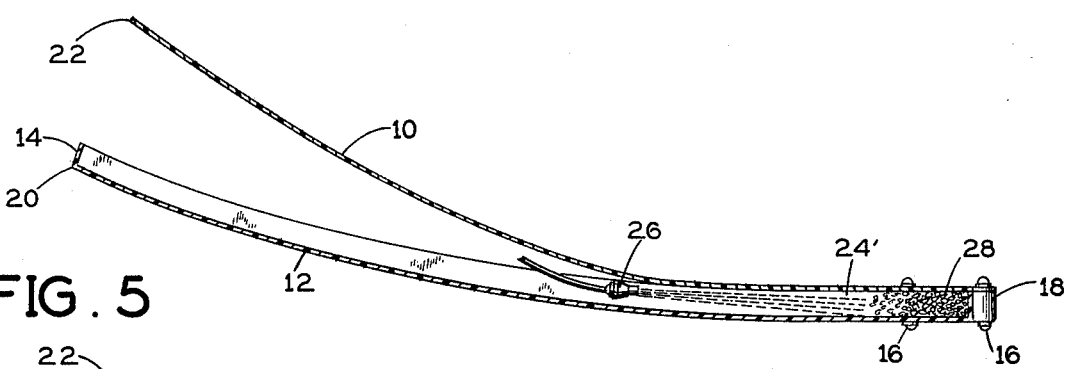
FIG. 5 is a sectional view similar to FIG. 4 illustrating a new position for the clamps to extend the hollow space, and filling of the hollow space with foam.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

Foam filled panels or laminates are usually made with polyurethane foam. Polyurethane foam is sometimes prepared by the reaction of a diisocyanate, such as toluene diisocyanate, with water or carboxylic acid to yield carbon dioxide and either an amine or an amide. Crosslinking takes place to form an insoluble foam of desired density. The reactants may be sprayed into the place where the foaming is to take place, and usually two different materials are sprayed together so that they react when they come in contact. An example of suitable reactant materials is known as the "uropac" foam system, and the two reactant materials, known as the resin and the isocyanate, are used in equal percentages by weight.

The purpose of the present invention is to make foam filled panels of unusual shapes by spraying or discharging foamable material, such as polyurethane foam reactants, into a space between sheets which are clamped together.

The sheets 10 and 12 to be filled are illustrated in FIG. 1. In the illustrated embodiment, sheet 12 has a compound curvature. That is, it curves both longitudinally and transversely. Sheet 12 has a generally triangular shape. It has upturned edges 14 extending completely around its margin so that, in a sense, it forms an open-topped container. Sheet 10 may be either curved or flat, and if flat, it is sufficiently resilient that it can be made to conform to the shape of sheet 12 when the sheets are clamped together. Sheet 10 has a generally triangular configuration complementing the configuration of sheet 12. The sheets are preferably made of fiberglass material and can be fabricated by well known fiberglass molding techniques.

In carrying out the method of the invention, sheets 10 and 12 are first placed in a generally fixed position in overlapping relation as shown in FIG. 2. Next, the sheets 10 and 12 are clamped together with clamps 16 at one end 18 of the sheets. The other ends 20 and 22 of the sheets are spread apart to form a hollow, closed space or cavity 24 between the sheets where clamped as illustrated in FIG. 3.

Foamable material is then introduced into the hollow space 24 while causing the foamable material to foam and at least partially fill the hollow space 24. The foamable material described previously is preferably introduced from a sprayer or discharge nozzle 26 which is moved back and forth across the sheets. The sprayer discharges both reactants of the foamable material into the hollow space 24 so that the materials react when they come in contact with each other and foam so as to fill hollow space 24. The resulting foam 28 is a rigid, relatively insoluble material after it has cured.

Once the relatively small hollow space 24 has been at least partially filled, spraying is terminated. The panels are reclamped, for example as shown in FIG. 5, to extend the hollow space toward the free ends 20 and 22 of the sheets. Foamable material is again introduced from the sprayer 26 in to the extended hollow space 24' while causing the material to foam so as to at least partially fill the extended hollow space. Spraying is terminated when this extended hollow space is suitably filled.

Figure 6:
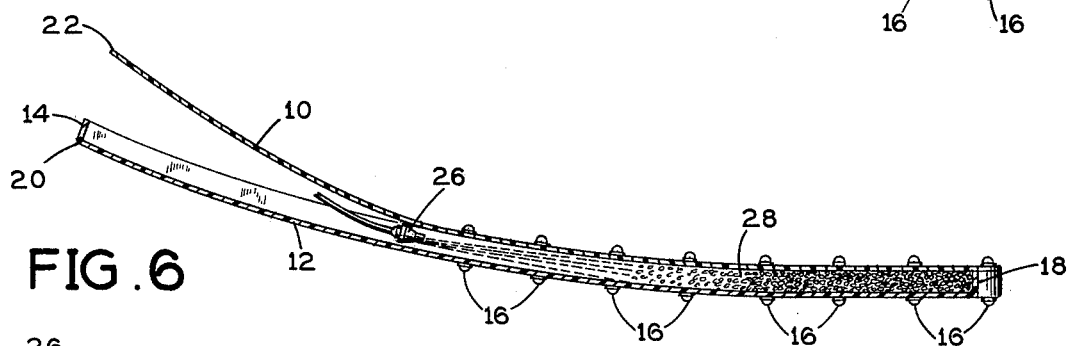
FIG. 6 is another sectional view similar to FIGS. 4 and 5 showing the progressive clamping of the sheets working toward the free ends thereof.
Figure 7:
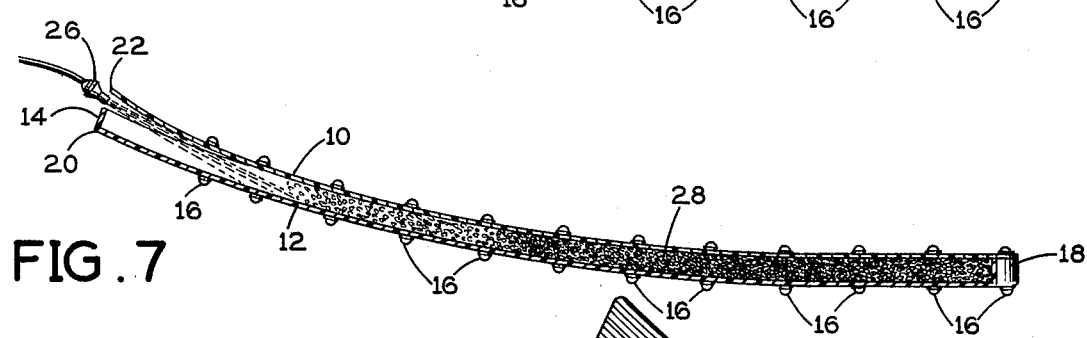
FIG. 7 is another in the series of sectional views illustrating the progressive filling of the sheets working toward the free ends.

FIGS. 6 and 7 illustrate the progressive clamping and filling of successive adjoining portions of the sheets 10 and 12 with foamable material which foams therein working progressively toward the opposite ends 20 and 22 of the sheets until a foam filled panel is formed. Note that the sheets are kept at a fixed location during all steps of the filling and foaming, and the sprayer or discharge nozzle 26 moves progressively toward the free ends of the sheets as successive stages of the sheets are filled. In FIG. 7, the clamps 16 extend over most of the length of the sheets. The polyurethane foam 28 ultimately bonds the sheets 10 and 12 together after it has cured.

Figure 8:
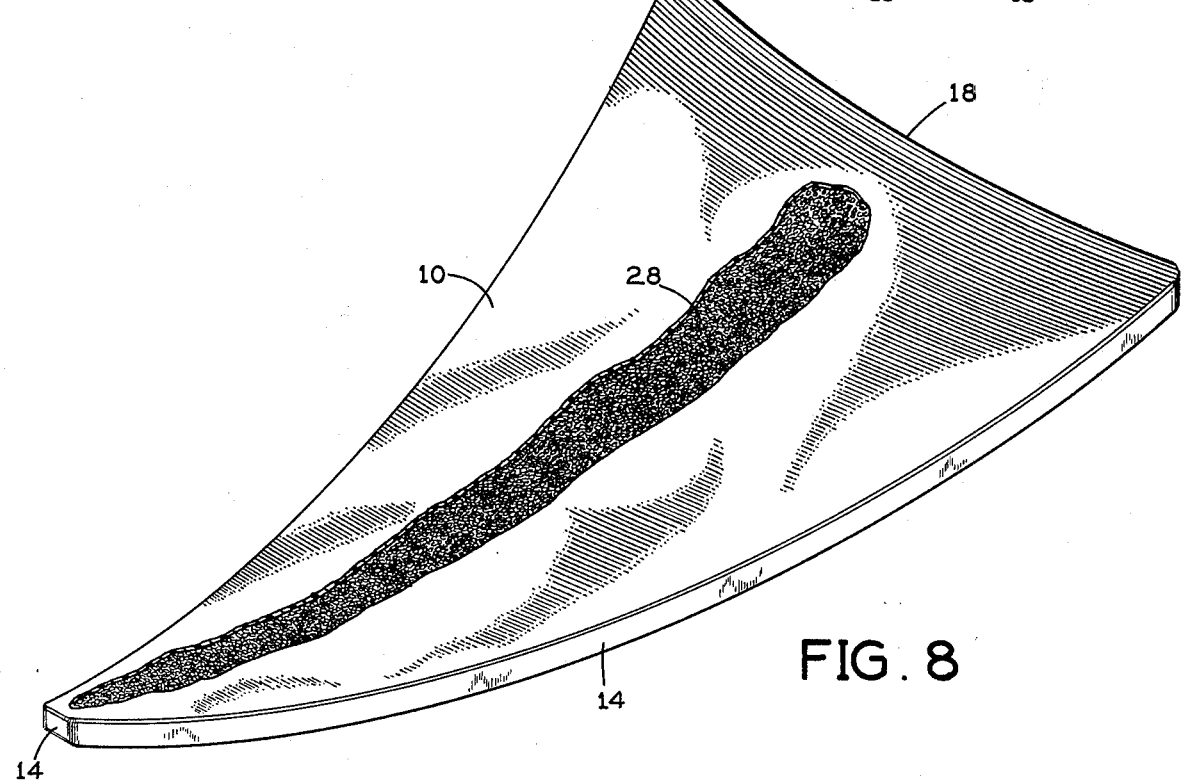
FIG. 8 is a perspective cut-away view of the completed foam filled panel.

FIG. 8 illustrates the final foam filled panel. The longitudinal curvature and transverse curvature of the panel may be seen clearly in this view. The method of the invention is particularly advantageous for making such panels of unusual shapes, and specifically, panels with a compound curvature. Special configurations such as indentations may be formed in the panels if desired. No bulky and expensive molding equipment is required. No conveyers or other continuous processing equipment are required either.

I claim:
1. A batch method of making a foam filled panel comprising:
    placing a first sheet in a generally stationary position; said first sheet having turned edges around its margin;
    placing against said first sheet a second flexible sheet adapted to rest at said marginal edges;
    selectively clamping marginal edges of said sheets together at one end thereof with individual clamps placed at laterally opposed marginal edges of said sheets;
    spreading said sheets apart from the opposite end thereof so that a hollow, closed space is formed between said sheets where so clamped;
    after said spreading, introducing foamable material into said hollow space while causing said foamable material to foam so as to fill said hollow space at least partially and then terminating the introduction of foamable material;
    while continuing to clamp said sheets at said one end, further selectively clamping laterally opposed marginal edges of said sheets adjoining said one end with additional individual clamps to extend said closed, hollow space;
    after said further clamping, introducing foamable material into said extended hollow space while causing said material to foam so as to fill said extended hollow space at least partially and then terminating the introduction of foamable material;
    progressively alternately selectively clamping with further additional clamps and filling adjoining portions of said sheets with foamable material which foams therein until a foam filled panel is formed; and
    keeping said sheets substantially stationary at a fixed location during the foregoing clamping and filling steps.

2. The method as claimed in claim 1, wherein said first sheet is curved between said ends.

3. The method as claimed in claim 1, wherein said foamable material after foaming bonds said sheets together.

4. The method as claimed in claim 1 wherein said steps of introducing foamable material into said hollow space are carried out by spraying the foamable material from a sprayer.

5. The method as claimed in claim 4 wherein said sprayer is moved relative to said hollow space while spraying foamable material therein.

* * * * *